F. H. REAM.
UNIVERSAL JOINT.
APPLICATION FILED APR. 10, 1916.
1,225,174.
Patented May 8, 1917.
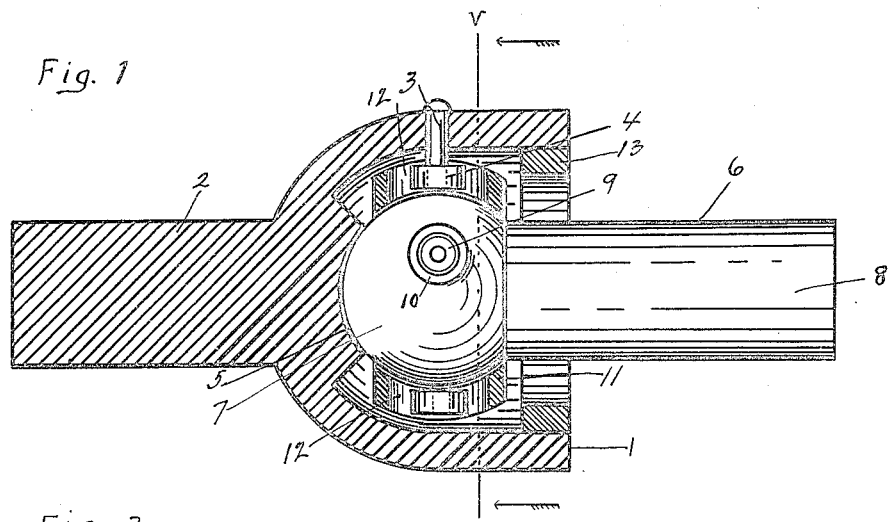
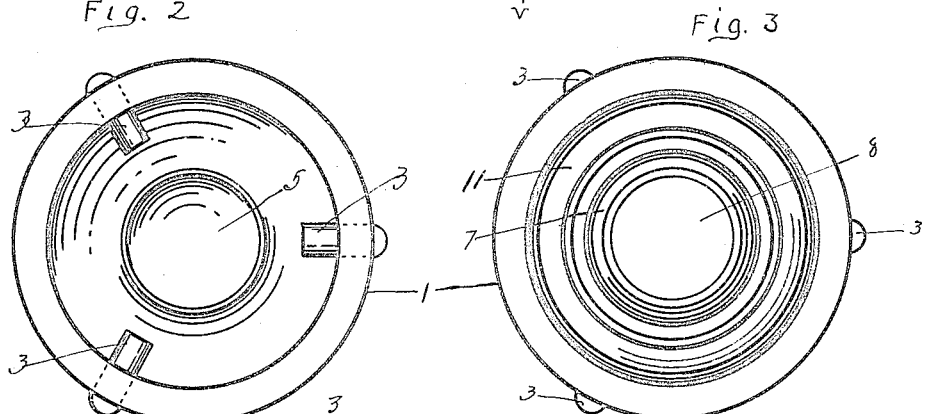
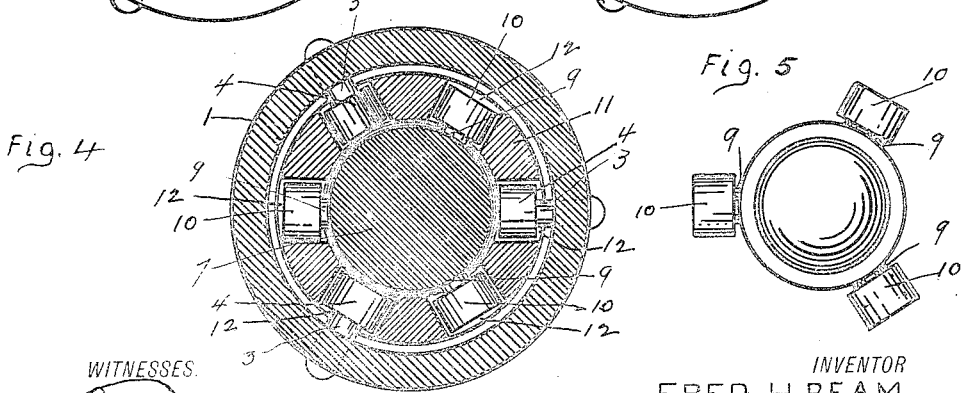
WITNESSES
INVENTOR
FRED H. REAM
BY
ATTORNEY

UNITED STATES PATENT OFFICE.

FRED H. REAM, OF KANSAS CITY, MISSOURI, ASSIGNOR TO NOEL FOUR-WHEEL-DRIVE MANUFACTURING COMPANY, OF KANSAS CITY, MISSOURI.

UNIVERSAL JOINT.

1,225,174.  Specification of Letters Patent.  Patented May 8, 1917.

Application filed April 10, 1916. Serial No. 90,139.

*To all whom it may concern:*

Be it known that I, FRED H. REAM, a citizen of the United States, residing at Kansas City, in the county of Jackson and State of Missouri, have invented a new and useful Universal Joint, of which the following is a specification.

My invention relates to universal joints which are used for receiving and imparting power.

The objects of my invention are, first, to provide a cheap, durable and efficient universal joint which may be used for driving traction wheels of all description and for communicating power from a rigid shaft to operable mechanism remote therefrom, second, to provide a cup member having studs with rollers at regular intervals attached to its inner side wall, third, to provide a mobile member having a ball provided with studs at regular intervals circumferentially having rollers thereon, fourth, to provide a concentric idle ring for the ball and having transverse slotted apertures to engage the rollers carried by the cup member and by the ball, whereby power applied to the one member will be communicated to the other member and, fifth, to provide a lock-ring removably mounted on the cup member to hold the mobile member in place.

I accomplish these objects by means of the mechanism illustrated in the accompanying drawing, in which—

Figure 1 is a vertical section through the cup member and the idle ring and showing the mobile member in operative engagement with the cup member and the lock ring in place and holding the mobile member in place;

Fig. 2 is a view of the interior of the cup member and showing the socket on its closed end and the inwardly projecting studs carried by the cup member;

Fig. 3 is a view of the top of the joint, taken from the mouth of the cup member, and showing the parts operatively assembled;

Fig. 4 is a view of the joint taken on the line V—V, in Fig. 1, and showing the respective series of rollers engaged by the slots in the idle ring on the ball of the mobile member, and Fig. 5 is a view of the ball on the mobile member and showing the studs and rollers carried by the ball and the graduated portion of the ball which is lodged in the socket in the cup member.

Similar reference numerals refer to corresponding parts throughout the several views.

Referring to the drawings, the numeral 1, is a cup-shaped member, which is preferably made of steel, cast or formed to shape. A stub shaft 2, is, in this instance shown formed integral with the closed end of the cup, but it may be otherwise attached thereto. The stub shaft is adapted for coupling the joint with a power driven shaft. A series of studs 3, are secured at regular intervals circumferentially of the cup and project into the interior thereof a little distance. Rollers 4, are mounted idly on the projecting ends of the studs 3, within the cup member. A socket 5, is formed centrally in the inner side of the closed end of the cup member, and the adjacent surface surrounding the socket is formed concave. A mobile member 6, adapted to be assembled with the cup member, consists of a ball 7, adapted to lodge in the socket 5, and having a stub shaft 8, fixed thereto and a series of studs 9, having rollers 10, similar to the rollers 4, carried by the cup member, and similarly located on the ball. A concentrically formed idle ring 11, having considerable width and thickness, and provided with elongated transverse slots 12, extending therethrough at regular intervals and corresponding in number with the total of the studs having rollers carried by the cup member and the mobile member, is slidably mounted on the ball 7, transversely of the stub shaft 8. The rollers 4 and 10, roll upon the vertical sides of the slots responsive to the movements of the mobile member. A lock ring 13, is provided with external screw threads adapted to engage internal screw threads at the mouth of the cup member and is adapted to hold the mobile member in proper place.

My invention constructed as hereinabove described operates as follows: The idle ring 11, is placed on the ball 7, and the rollers 4 and 10, are deposited in the slots 12, in the idle ring, and the studs 9, are passed through the adjacent rollers 10, and secured on the ball 7. The mobile member is then inserted in the cup member in such a manner that the graduated portion of the ball 7, will be lodged in the socket 5. The studs 3, are extended through the side of the cup member and passed through the adjacent rollers 4. The respective studs may be secured on the respective members by screws or any other suitable means, preferably, by means of screw threads formed on the studs. While the studs are being passed through the rollers, the mobile member is held in horizontal position to facilitate the assembly of the rollers with the studs. The lock ring is then screwed down closely adjacent the ball 7 and the outer edge of the idle ring mounted thereon to hold the members in place. When a turning pressure is applied to the stub shaft 2, on the cup member the latter is revolved thereby, and the studs 3, acting on the rollers 4, impel a corresponding motion of the idle ring. The idle ring being thus forced to move with the member, engages the rollers 10, on the studs 9, and turns the mobile member. If the mobile member is deflected from straight alinement the elongated slots 12, permit the ball and idle ring to turn and roll at the same time. This provision is for the mobile member to receive and impart power at various angles to the power shaft.

Having described my invention, what I claim is—

A universal joint, comprising a cup member provided circumferentially with inwardly projecting spaced apart studs having rollers, a shaft having a ball at its inner end provided circumferentially with outwardly projecting spaced apart studs having rollers, an idle ring interposed between said cup member and the ball on said shaft and having transversely extending elongated apertures alternately engaged by the rollers on said cup member and the rollers on said shaft, and a lock ring adjustably mounted on the inner side of said cup member and adapted for holding said ball on the shaft in said cup member.

Dated, Kansas City, Missouri, April 6, 1916.

FRED H. REAM.

Witnesses:
ELI NOEL,
J. MORGAN MARMADUKE.